United States Patent [19]

Emmenthal et al.

[11] Patent Number: 4,754,740
[45] Date of Patent: Jul. 5, 1988

[54] DEVICE FOR CONTINUOUS FUEL INJECTION

[75] Inventors: Klaus-Dieter Emmenthal; Detlef Pickert, both of Wolfsburg; Wolfgang Wehling, Braunschweig, all of Fed. Rep. of Germany

[73] Assignee: Volkswagenwerk Aktiengesellschaft, Wolfsburg, Fed. Rep. of Germany

[21] Appl. No.: 115,656

[22] Filed: Oct. 27, 1987

Related U.S. Application Data

[63] Continuation of Ser. No. 738,773, May 29, 1985, abandoned.

[30] Foreign Application Priority Data

May 29, 1984 [DE] Fed. Rep. of Germany ....... 3420029

[51] Int. Cl.$^4$ .............................................. F02M 39/00
[52] U.S. Cl. .................................. 123/533; 123/585; 123/531
[58] Field of Search ............... 123/586, 585, 452, 531, 123/533, 453, 454, 455

[56] References Cited

U.S. PATENT DOCUMENTS

| | | | |
|---|---|---|---|
| 4,206,599 | 6/1980 | Sumiyoshi | 123/531 |
| 4,311,126 | 1/1982 | Cowles | 123/586 |
| 4,368,714 | 1/1983 | Emmenthal | 123/533 |
| 4,387,695 | 6/1983 | Hoppel | 123/586 |
| 4,429,674 | 2/1984 | Lubbing | 123/585 |
| 4,465,050 | 8/1984 | Igashira | 123/533 |
| 4,491,107 | 1/1985 | Hasegawa | 123/585 |
| 4,519,941 | 5/1985 | Nakagawa | 123/586 |

FOREIGN PATENT DOCUMENTS

| | | | |
|---|---|---|---|
| 2838893 | 3/1979 | Fed. Rep. of Germany | 123/586 |
| 2920636 | 12/1980 | Fed. Rep. of Germany | 123/586 |
| 3222000 | 6/1982 | Fed. Rep. of Germany | 123/586 |

Primary Examiner—Carl Stuart Miller
Attorney, Agent, or Firm—Brumbaugh, Graves, Donohue & Raymond

[57] ABSTRACT

Apparatus for the continuous injection of fuel into the intake piping of an internal combustion engine comprises an air pump for delivering an air stream portion deviated from the engine intake pipe, a fuel pump for delivering fuel from a source, a metering device controlled in response to operating conditions of the internal combustion engine and receiving fuel delivered by said fuel pump and the air stream portion delivered by said air pump for mixing said fuel and air stream portion and delivering the same to the intake piping of the engine, in which the supply of said air stream portion to the metering device is interrupted during an operating condition of the engine, preferably a coasting condition of operation of the engine. Interruption of the air stream portion may be effected by a shut-off valve in the conduit delivering the air stream portion from the air pump, responsive to a coasting condition of the engie. Alternatively, this may be accomplished by disabling the air pump during a coasting operation of the engine and enabling the air pump at the end of such operation.

9 Claims, 1 Drawing Sheet

U.S. Patent   Jul. 5, 1988   4,754,740
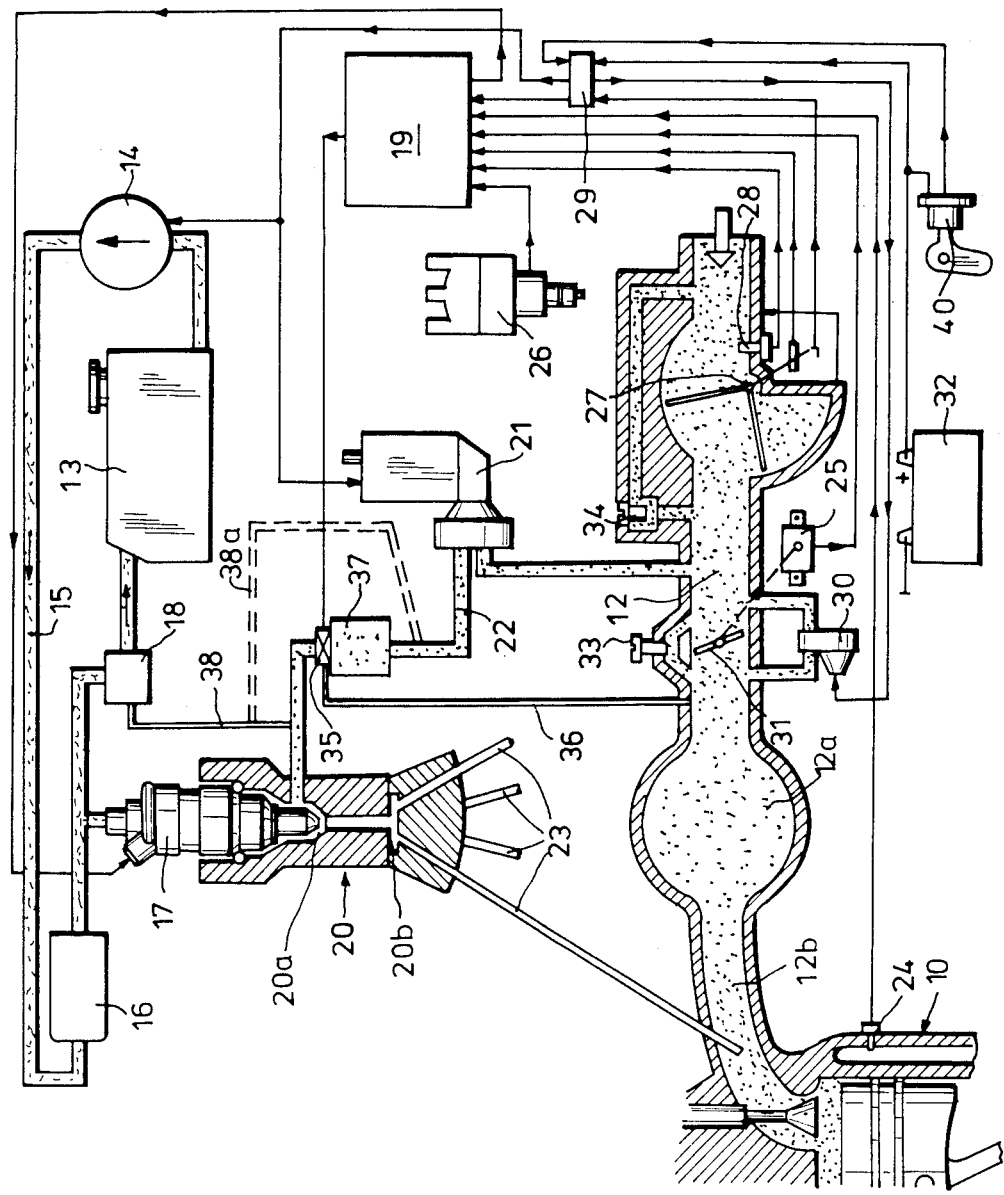

DEVICE FOR CONTINUOUS FUEL INJECTION

This application is a continuation of Ser. No. 738,773 filed on May 29, 1985 now abandoned.

BACKGROUND OF THE INVENTION

This invention relates to a device for continuous injection of fuel into the intake pipe of an internal combustion engine.

Fuel injection devices of similar construction are known in principle from DE-OS No. 29 20 636 and DE-OS No. 32 22 000. In these devices, the fuel is not injected into the intake pipe leading to the cylinders of the internal combustion engine, but is first injected into an air stream which is deviated from the intake piping. The air stream is propelled by an air pump. The mixture thus obtained is then passed into individual injection lines. These injection lines correspond to the individual cylinders of the internal combustion engine, and are in turn connected to the intake pipes just before the intake valves of the cylinders. The advantage of this fuel injection device over conventional fuel injection devices is that no injection nozzles are required for the injection of the fuel-air mix under pressure into the suction pipes corresponding to the individual cylinders. This results from the fact that even small amounts of the mix under pressure expand when entering the suction pipe so that the mix is atomized and sprayed. In addition, the liquid fuel contained in the fuel-air mix is at least partially evaporated during this expansion, which further improves the characteristics of the fuel.

With such fuel injection devices, however, the response characteristics of the internal combustion engine may be adversely affected under certain conditions of operation, especially when the vehicle is coasting. The vehicle is driven in this situation, by the kinetic energy of its own mass, and not by the engine, the throttle valve being shut off. The fuel metering device is shut off to reduce fuel consumption while the air pump continues running, so that all the fuel in the piping between the mixing device and the point of injection is carried into the cylinders of the internal combustion engine. After the coasting operation ends and fuel metering is resumed by the metering device, the fuel requires a certain time to reach the admission line and the cylinders from the point of supply through the mix piping system, resulting in a delay in the response characteristics of the internal combustion engine.

SUMMARY OF THE INVENTION

The basic objective of the present invention is to provide a device for the continuous injection of fuel into the intake piping of an internal combustion engine which is free from the above-noted deficiencies of the prior art fuel injection devices.

According to the invention, this objective is achieved by providing means rendered operative during the coasting operation of the internal combustion engine, for shutting off the partial air stream supplied to the mixing device, together with the fuel metering device. This is effected in such fashion that the piping between the mixing device and the points of injection into the suction lines of the internal combustion engine remains virtually deprived of flow. The fuel contained in this piping is then preserved, so that when fuel and air delivery is resumed after the end of the coasting operation, this fuel can be conveyed from the mixing device directly to the cylinders of the internal combustion engine without substantial delay.

Shut off of the partial air stream to the mixing device may be effected either by means of a shut-off valve in the pipe between the air pump and the mixing device, or by shutting off the air pump itself. If the air pump continues running, and only a shut-off valve, controlled, for example, by the position of the throttle valve or by the intake line pressure before the throttle valve, is used, then an accumulator means can be provided between the shutoff valve and the air pump. The accumulator means remains loaded as long as the shut-off valve is closed and, after the shut-off valve is opened, it provides an increased pressure pulse for faster delivery of the fuel from the metering device to the cylinders of the internal combustion engine.

The drawing shows a preferred embodiment of a fuel injection device constructed according to the invention on a conventional, enriched mix internal combustion engine 10, such as the kind used to power an automobile.

DESCRIPTION OF THE PREFERRED EMBODIMENT

The internal combustion engine 10 is provided with intake piping 12 including an intake manifold 12a and a multiplicity of intake pipes 12b, corresponding to the individual cylinders of the engine. Fuel from a supply container 13 is fed by a fuel pump 14 through a pipe 15 and a fuel filter 16 to a fuel metering device formed by an injection valve 17. A pressure regulator 18 keeps the fuel pressure at the injection valve 17 at a preset value and returns the excess fuel to the fuel supply container 13.

The injection valve 17 is controlled by a control device 19 in response to the operating conditions of the internal combustion engine, so as to provide an optimum amount of fuel according to the instantaneous operating conditions of the engine. To this end, it advances the fuel in a mixing and distributing means 20 to a carrier air stream, obtained by deviating part of the air stream from the intake pipe 12 of the internal combustion engine. This partial air stream is pumped by an air pump 21 and delivered through a pipe 22 to the mixing and distributing means 20.

The mixing and distributing means 20 comprises a mixing chamber 20a, into which the fuel injection nozzle of the injection valve 17 protrudes and to which the partial air stream is supplied by the pipe 22. The mixing and distributing means 20 also contains a mix distribution chamber 20b, in which the air-fuel mix formed in mixing chamber 20a is evenly distributed to a plurality of injection lines 23 corresponding to the individual cylinders of the internal combustion engine. The injection lines 23 are connected to suction lines 12b corresponding to the respective cylinders of the internal combustion engine 10, so that the mix consisting of the carrier air and fuel is injected into the cylinders near the intake valves.

The control device 19 is connected to receive signals from a multiplicity of sensing devices in order to control the injection valve 17 in response to the operating conditions of internal combustion engine 10. These sensing devices include, for example, a temperature sensor 24, for sensing a characteristic temperature of the cylinder block of the internal combustion engine 10; a switch 25, for sensing the position of the throttle valve located in the intake line 12; an ignition timer 26, which generates a value proportional to the rotational speed of the internal combustion engine; an air flow meter 27; and an intake air temperature sensor 28.

A relay assembly 29 starts the air pump 21 and the fuel pump 14 when the ignition switch 40 of the vehicle is turned on. An additional air supply valve 30 bypasses the throttle valve 31 in the suction piping 12 and a battery power supply 32 is provided for the vehicle. An idling speed adjustment screw 33 and an idling mix adjustment screw 34, are both installed on the intake line 12.

In order to prevent air pump 21, which continues running during the coasting operation of the vehicle, from emptying the fuel-air mix from the lines 23 while injection valve 17 is shut off to reduce fuel consumption, the delivery of the partial air stream to the mixing and distributing means 20 is interrupted by a shut-off valve 35, provided between the air pump 21 and the mixing and distributing means 20. The valve 35 can be controlled, e.g., by the control device 19, according to the position of the throttle valve 31 or of the throttle valve switch 25, or according to the suction line pressure in the intake pipe 12 before throttle valve 31. In the latter case, the shut-off valve 35 is provided with a pneumatic adjusting device, which is connected to the intake pipe 12 downstream from the throttle valve 31 through a connecting pipe 36.

By closing the shut-off valve 35 during the coasting operation, the air flow through the mixing and distributing means 20, as well as through the injection pipes 23, is interrupted and the fuel-air mix contained in these pipes is preserved for the subsequent mode of operation. After the shut-off valve 35 has been opened at the end of the coasting operation, air and fuel delivery to the cylinders of the internal combustion engine is resumed immediately and without substantial delay. The resumption of fuel delivery following the coasting operation, which usually entails acceleration of the fuel, can be further improved by providing an accumulator means 37 in the partial air stream line between the shut-off valve 35 and the air pump 21, which continues running during coasting. The accumulator means 37 is loaded when the shut-off valve 35 is closed and when this valve is opened, it provides, for a certain time, an increased carrying air pressure level for faster fuel delivery.

The fuel pressure regulator 18 may be connected to the partial air stream pipe 22 either after or before the accumulator means 37 and the shut-off valve 35, by a pipe indicated by full lines 38 and dashed lines 38a, respectively.

Interruption of the partial air stream delivery to the mixing and distributing means 20 may also be achieved by directly shutting off the air pump 21 during the coasting operation. In this case, the additional shut-off valve 35 would not be required, but means should be provided to start the air pump immediately after the end of the coasting operation and to shut off the partial air stream pipe 22 when the air pump is not running.

The specific embodiment described above is intended to be illustrative and modifications in form and detail are possible within the scope of the following claims.

We claim:

1. Apparatus for the continuous injection of fuel into the intake piping of an internal combustion engine comprising:
    conduit means including air supply means for delivering an air stream portion deviated from the engine intake, pipe means including a fuel pump for delivering fuel from a source, metering means controlled in response to operating conditions of the internal combustion engine and receiving fuel delivered from said fuel pump and only the air stream portion delivered by said air supply means for mixing said fuel and air stream portion in a centralized chamber, said conduit means including piping sections for delivering the mixed fuel and air stream portion from the centralized chamber to the intake piping of the internal combustion engine wherein the improvement comprises means responsive to an operating condition of the engine for interrupting the supply of said air stream portion delivered to said metering means only during coasting so that virtually none of the mixed fuel and air stream portion in said piping sections is delivered to the engine.

2. Apparatus as in claim 1 in which the means for interrupting said air stream portion is responsive to a coasting operation of said engine.

3. Apparatus as in claim 1 or claim 2 in which said conduit means is provided with shut-off valve means responsive to the operating condition of the engine.

4. Apparatus as in claim 3 in which said engine is provided with a throttle valve in said engine intake piping and said shut-off valve means is responsive to the position of said throttle valve.

5. Apparatus as in claim 3 in which the shut-off valve means is responsive to the pressure in said intake pipe before the throttle valve.

6. Apparatus as in claims 1, 2 or 4 in which accumulator means are provided in said conduit means between said shut-off valve means and said air supply means for providing an increased pressure pulse when said shut-off valve means is opened.

7. Apparatus as in claim 1 or claim 2 in which means are provided for disabling said air supply means in response to a coasting operation of said engine and enabling said air supply means at the end of an engine coasting operation.

8. Apparatus as in claim 1 or claim 2 in which said conduit means is provided with shut-off valve means responsive to the operating condition of the engine, and further comprising accumulator means provided inside said conduit means between said shut-off valve means and said air supply means for providing an increased pressure pulse when said shut-off valve means is opened.

9. Apparatus as defined in claim 3, in which said shut-off valve means is responsive to the pressure in said intake pipe for the throttle valve, and further comprising accumulator means provided in said conduit means between said shut-off valve means and said air supply means for providing an increased pressure pulse when said shut-off valve means is opened.

* * * * *